US012693200B2

(12) United States Patent
Matsushita et al.

(10) Patent No.: US 12,693,200 B2
(45) Date of Patent: Jul. 28, 2026

(54) WETTABILITY EVALUATION DEVICE AND METHOD

(71) Applicant: Hitachi High-Tech Corporation, Tokyo (JP)

(72) Inventors: Yufuku Matsushita, Tokyo (JP); Atsushi Kishioka, Tokyo (JP); Masafumi Miyake, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 260 days.

(21) Appl. No.: 18/577,291

(22) PCT Filed: May 30, 2022

(86) PCT No.: PCT/JP2022/022017
§ 371 (c)(1),
(2) Date: Jan. 8, 2024

(87) PCT Pub. No.: WO2023/013221
PCT Pub. Date: Feb. 9, 2023

(65) Prior Publication Data
US 2025/0044208 A1      Feb. 6, 2025

(30) Foreign Application Priority Data
Aug. 6, 2021      (JP) ................................. 2021-129964

(51) Int. Cl.
*G01N 13/02*      (2006.01)
*G01N 27/06*      (2006.01)
*G01N 27/333*      (2006.01)

(52) U.S. Cl.
CPC ..... *G01N 13/02* (2013.01); *G01N 2013/0266* (2013.01); *G01N 27/06* (2013.01); *G01N 27/333* (2013.01)

(58) Field of Classification Search
CPC ........ G01N 13/00; G01N 13/02; G01N 27/06; G01N 27/07; G01N 2013/0241; G01N 2013/0266
See application file for complete search history.

(56) References Cited

U.S. PATENT DOCUMENTS 4,196,615 A * 4/1980 Davis ..................... G01N 13/02
73/64.52
4,523,456 A * 6/1985 Baird ..................... G01N 13/02
73/64.48

(Continued)

FOREIGN PATENT DOCUMENTS

CN          101311703 A      11/2008
JP          2011-059104 A      3/2011

OTHER PUBLICATIONS

Hitoshi Yokota, et al., "Estimation of Wettability between Metals and Hg by Interfacial Impedance Method", J. Japan Inst. Metals, vol. 57. No. 12 (1993), pp. 1445-1450.

(Continued)

*Primary Examiner* — Justin N Olamit
(74) *Attorney, Agent, or Firm* — MATTINGLY & MALUR, PC

(57) ABSTRACT

An object of the present invention is to provide a method of evaluating wettability at lower cost than existing methods. According to a preferred aspect of the present invention, a wettability evaluation device includes a flow path into which a first medium and a second medium are introduced, a measuring instrument that measures a current value of a current flowing through the flow path when the first medium and the second medium are introduced, and a control unit that evaluates wettability of an inner wall surface of the flow path based on the current value.

11 Claims, 13 Drawing Sheets

(56) References Cited

U.S. PATENT DOCUMENTS

| | | | |
|---|---|---|---|
| 5,121,636 | A | 6/1992 | Seiter et al. |
| 9,964,479 | B2 * | 5/2018 | Lee ........................ G01N 13/02 |
| 11,906,688 | B2 * | 2/2024 | Santos .................... G01V 3/24 |
| 2008/0159073 | A1 | 7/2008 | Chen et al. |
| 2015/0233810 | A1 | 8/2015 | Lee et al. |
| 2016/0216190 | A1 | 7/2016 | Palla et al. |
| 2017/0292902 | A1 | 10/2017 | Bardapurkar et al. |
| 2021/0103070 | A1 | 4/2021 | Santos et al. |

OTHER PUBLICATIONS

International Search Report of PCT/JP2022/022017 dated Jul. 12, 2022.
Chinese Office Action received in corresponding Chinese Application No. 202280047941.3 dated May 11, 2026.
Communication Pursuant to Article 94(3) EPC received in corresponding European Application No. 22 852 649.7 dated Jun. 5, 2026.
Ma, Y. et al., "Dimension-reconfigurable bubble film nanochannel for wetting based sensing", Nature Communications, 2020, pp. 1-11.

* cited by examiner

| FLOW PATH LENGTH (a.u.) | FLOW PATH INNER DIAMETER (a.u.) | AIR BUBBLE SIZE (a.u.) | APPLIED VOLTAGE (a.u.) | ANALYZED CURRENT VALUE (a.u.) | WETTABILITY PARAMETER 1 (a.u.) | |
|---|---|---|---|---|---|---|
| 50 | 1 | 1.5 | 3 | 0.5 | 0.4 | ⋯ |
| 50 | 1 | 1.5 | 3 | 1.3 | 2.8 | ⋯ |
| 50 | 1 | 1.5 | 3 | 1.5 | 4.3 | ⋯ |
| 50 | 1 | 1.5 | 3 | 3.3 | 6.5 | ⋯ |
| 50 | 1 | 1.5 | 3 | 5.1 | 8.4 | ⋯ |
| 50 | 1 | 1.5 | 3 | 8.3 | 9.8 | ⋯ |
| 50 | 1 | 1.5 | 3 | 10.5 | 10.5 | ⋯ |
| 50 | 1 | 1.5 | 3 | 20.4 | 12.1 | ⋯ |
| ⋯ | ⋯ | ⋯ | ⋯ | ⋯ | ⋯ | ⋯ |

| | THRESHOLD VALUE 1 (RECOMMEND REPLACEMENT WITHIN ONE WEEK) | THRESHOLD VALUE 2 (RECOMMEND REPLACEMENT WITHIN TWO WEEKS) | THRESHOLD VALUE 3 (RECOMMEND REPLACEMENT WITHIN ONE MONTH) | |
|---|---|---|---|---|
| WETTABILITY PARAMETER 1 | 4.5 | 7 | 9 | ... |
| WETTABILITY PARAMETER 2 | 0.2 | 0.5 | 0.9 | ... |
| WETTABILITY PARAMETER 3 | 48 | 52 | 60 | ... |
| ... | ... | ... | ... | ... |

WETTABILITY EVALUATION DEVICE AND METHOD

TECHNICAL FIELD

The present disclosure relates to a technique for evaluating wettability.

BACKGROUND ART

A technique for evaluating liquid wettability is required. For example, an analyzer for analyzing a solution component is provided with a flow path pipe for feeding a sample liquid or a reagent liquid. The wettability of the flow path pipe is exemplified as an important factor for appropriate liquid feeding.

For example, in a device that analyzes a component in blood, wettability changes due to contamination in a flow path pipe or the like, which causes liquid feeding abnormality such as a liquid residue, and carryover between samples causes a decrease in analysis accuracy. Therefore, it is desired to ascertain the state of wettability before an occurrence of the liquid feeding abnormality between the samples, and to perform maintenance management for maintaining an appropriate state.

As a conventional technique for evaluating wettability, an evaluation method using a flat plate material or the like as a target has been developed for the purpose of material research and the like. For example, in PTL 1, a method of vibrating a solid sample plate on which a liquid is placed, determining surface tension from the dynamics of the liquid during vibration, and obtaining a contact angle from the surface tension has been developed.

CITATION LIST

Patent Literature

PTL 1: JP 2011-059104 A

SUMMARY OF INVENTION

Technical Problem

The technique disclosed in PTL 1 has problems that an image sensor such as a camera is required for image capturing, and thus the mounting cost is high, and further, the analysis cost is also high because time division image data is handled.

An object of the present invention is to provide a method of evaluating wettability at lower cost than existing methods.

Solution to Problem

According to a preferred aspect of the present invention, a wettability evaluation device includes a flow path into which a first medium and a second medium are introduced, a measuring instrument that measures a current value of a current flowing through the flow path when the first medium and the second medium are introduced, and a control unit that evaluates wettability of an inner wall surface of the flow path based on the current value.

According to another preferable aspect of the present invention, a wettability evaluation method includes a first step of preparing a flow path, a second step of feeding a first medium and a second medium to a predetermined position in the flow path, and a third step of evaluating movement of charges between a first point and a second point interposing the predetermined position of the flow path.

Further features relating to the present disclosure will become apparent from the description of the specification and the accompanying drawings. The description in the specification is merely a typical example and is not intended to limit the scope of the claims or the application example of the present disclosure in any sense.

Advantageous Effects of Invention

The present invention has an effect of enabling evaluation of wettability at low cost. Objects, configurations, and advantageous effects other than those described above will be clarified by the descriptions of the following embodiments.

BRIEF DESCRIPTION OF DRAWINGS

FIG. 7 is a table of an example of a data set for estimating a wettability parameter stored in a database.

FIG. 8 is a table of an example of a relationship between the wettability parameter stored in the database and a threshold value.

DESCRIPTION OF EMBODIMENTS

Figure 1:
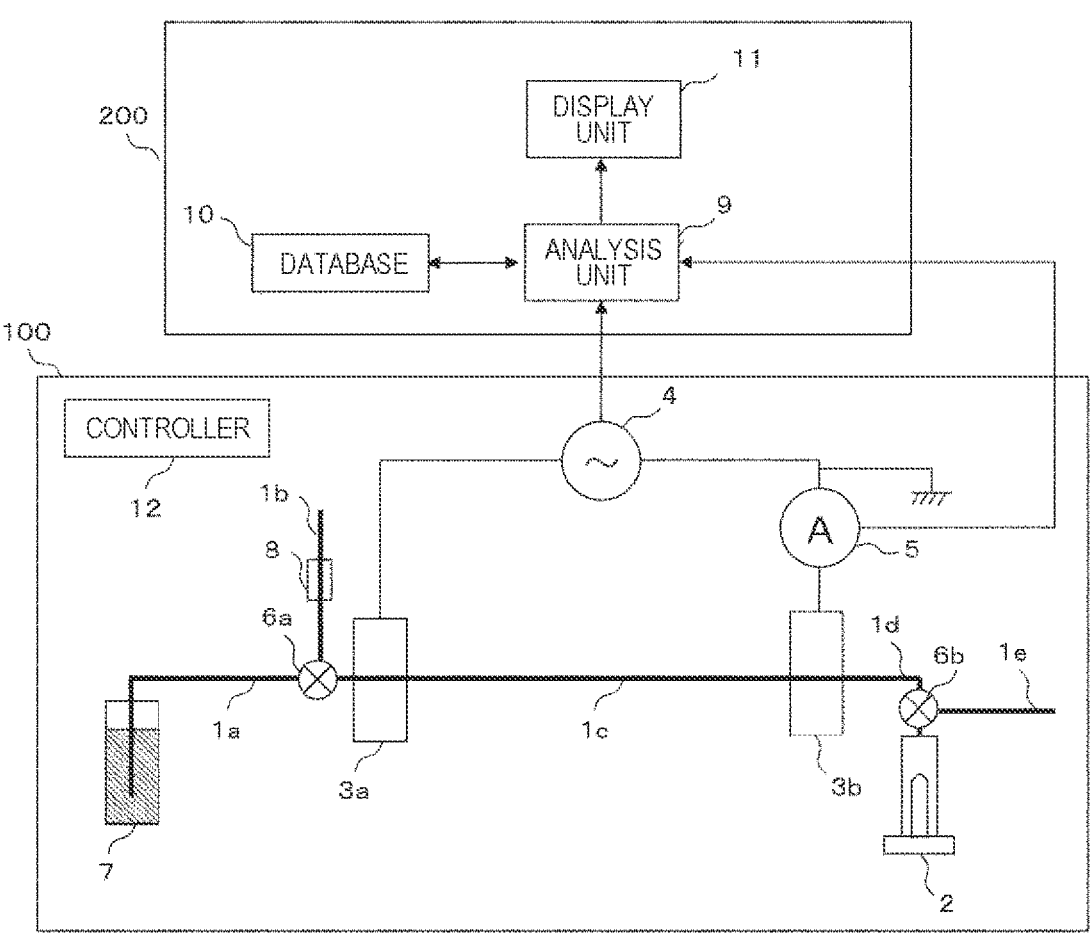
FIG. 1 is a schematic block diagram showing a wettability evaluation device according to a first embodiment.

Embodiments will be described in detail with reference to the drawings. The present invention is not construed as being limited to the descriptions of the embodiment as follows. Those skilled in the related art can easily understand that the specific configuration may be changed in a range without departing from the concept or the spirit of the present invention.

In the configurations of the embodiments described below, the same reference signs are commonly used for the same portions or portions having similar functions in different drawings, and repetitive description may be omitted.

When there is a plurality of elements having the same or similar functions, the same reference signs may be denoted with different subscripts for description. In addition, when it is not necessary to distinguish the plurality of elements from each other, the description may be made by omitting the subscript.

In the present specification and the like, the notations "first", "second", "third", and the like are used for identifying the constituent elements, and the notations does not necessarily limit the number, the order, or the contents thereof. In addition, a number for identifying a constituent element is used for each context, and a number used in one context does not necessarily indicate the same constituent element in another context. In addition, a constituent element identified by a certain number may also function as a constituent element identified by another number.

Positions, sizes, shapes, ranges, and the like of the components in the drawings and the like may not represent actual positions, sizes, shapes, ranges, and the like in order to facilitate understanding of the invention. Therefore, the present invention is not necessarily limited to the positions, sizes, shapes, ranges, and the like illustrated in the drawings and the like.

The publications, patents, and patent applications cited herein constitute a part of the description of the present specification as such.

Constituent elements expressed in the singular form herein are intended to include the plural form unless the context clearly dictates otherwise.

Since it is necessary to capture an image of a liquid, it is not possible to apply the technique disclosed in PTL 1 to the evaluation of the wettability of the flow path pipe in which observation of the inside is not possible. In an example of a technique described in the embodiments, as a method of evaluating wettability in a flow path pipe, there is provided a method of evaluating wettability in a flow path pipe at lower cost than an existing method by using, as an index, an electric conduction characteristic of the flow path pipe when air bubbles and the like are introduced into the flow path pipe. This method is applicable to a flow path in which the observation of the inside is not possible, and mounting cost and analysis cost are kept low.

A wettability evaluation device in a typical embodiment is a device including a flow path pipe through which a medium such as a solution can be fed. The device includes a mechanism for feeding the medium to the flow path pipe, a mechanism for applying a voltage to the flow path, and a mechanism for measuring a current flowing through the flow path, and includes means for introducing at least two or more types of media into the flow path, means for measuring a current value with respect to an applied voltage when the medium is introduced, and means for evaluating wettability of an inner wall surface of the flow path based on the current value.

A wettability evaluation device according to the present disclosure provides a method of evaluating the wettability of a flow path pipe at low cost and has an effect of enabling maintenance management of the flow path pipe for performing appropriate liquid feeding. The flow path pipe includes a flow path pipe in which observation of an inside is not possible, which has been conventionally difficult.

First Embodiment

Configuration Example of Wettability Evaluation Device

FIG. 1 is a schematic diagram showing a wettability evaluation device according to a first embodiment. The wettability evaluation device in the present embodiment includes a measurement unit 100 and a control unit 200.

The measurement unit 100 includes flow path pipes 1a to 1e for feeding a medium (fluid) such as a solution or a gas (delivering the medium is referred to as liquid feeding below), and a syringe pump 2 for feeding the medium to at least a part of a flow path pipe 1. A bottle 7 stores a liquid (solution) intended to be evaluated for wettability with the flow path pipe 1. An air filter 8 filters a gas introduced into the flow path pipe 1.

Three-way electromagnetic valves 6a and 6b and conductors 3a and 3b capable of bringing in electrical contact with a medium in the flow path are disposed in the flow path pipe 1. A voltage source 4 and an ammeter 5 are electrically connected to the conductors 3a and 3b.

A controller 12 includes, for example, a microcomputer, and controls operations of the syringe pump 2, the voltage source 4, the ammeter 5, the three-way electromagnetic valve 6, and the like. However, the operations may be performed manually or may be controlled by a control unit 200.

The control unit 200 includes an analysis unit 9 that analyzes output values from the voltage source 4 and the ammeter 5, a database 10 that stores data for calculating a relationship between a current value, a voltage value, and wettability, and a display unit 11 that displays an analysis result obtained by the analysis unit. The database 10 stores an evaluation table 700, a threshold-value database 800, time-series data 1000, a set threshold value, and the like, which will be described later.

The control unit 200 can be configured by a general computer including an input device, an output device, a processing device, and a storage device. The control unit 200 may be configured by a single computer, or any part of the input device, the output device, the processing device, and the storage device may be configured by another computer connected via a network.

When the control unit 200 is configured by a general computer, the control unit 200 includes an interface for inputting a signal from the measurement unit 100 to the input device. The output device includes a display unit 11 configured by a display monitor and the like. The database 10 is stored in the storage device such as a hard disk device. The analysis unit 9 is configured by software, stored in the storage device such as a semiconductor memory, and executed by the processing device such as a central processing unit (CPU), thereby enabling processing described later.

However, the control unit 200 may be configured by a dedicated device. FIG. 1 illustrates this form. In this case, the database 10 is stored in a dedicated memory (or an external database may be used), and the display unit 11 uses a dedicated image monitor. The analysis unit 9 can also implement a function equivalent to a function configured by software, by hardware such as a field programmable gate array (FPGA) and an application specific integrated circuit (ASIC). Alternatively, the analysis unit 9 may be mounted on a microcomputer.

In the present device, the wettability of the inner wall of the pipe 1c at ant position between the conductors 3a and 3b can be evaluated. When the syringe pump 2 performs suction, the pipe 1*d* side of the three-way electromagnetic valve 6*b* is opened, and thus the medium is introduced into the pipe 1*c*. When the syringe pump performs discharge, the pipe 1*e* side of the three-way electromagnetic valve 6*b* is opened, and thus the medium in a syringe is discharged. The medium to be introduced into the pipe 1*c* can be switched by the three-way electromagnetic valve 6*a*. In the device in the present embodiment, two media of an aqueous solution and a gas in which an electrolyte contained in the bottle 7 is dissolved can be introduced.

Note that, the gas can be taken in from the pipe 1*b* opened to the atmosphere, and is introduced into the pipe 1*c* after passing through the air filter 8. Note that, in the device in the present embodiment, it is not possible to ignore the influence of gravity on the surface tension of the medium on the wall surface of the flow path pipe, and thus, the flow path pipe 1*c* having the inner diameter set to 5 mm or less is set as a target.

Procedure Example of Wettability Evaluation

Figure 2:
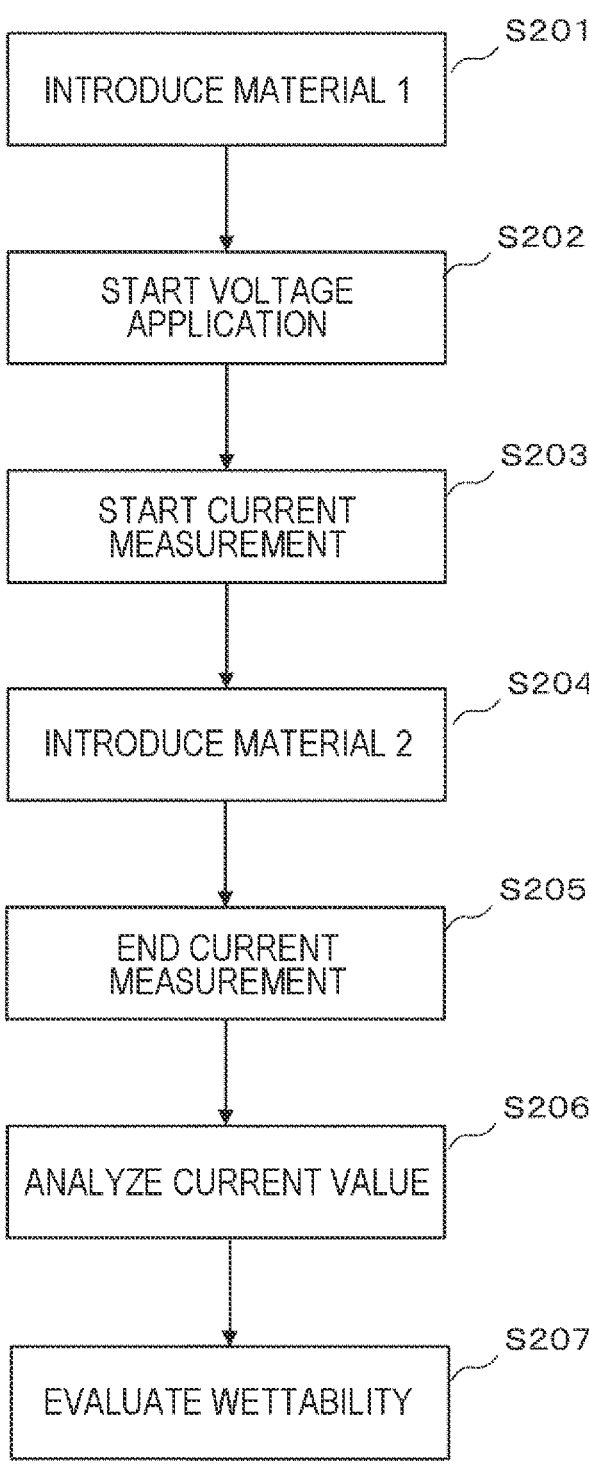
FIG. 2 is a flowchart of wettability evaluation.

With reference to FIG. 2, a wettability evaluation method in the device in the present embodiment will be described. FIG. 2 illustrates a flow of an evaluation method in the device illustrated in FIG. 1. It is assumed that the controller 12 controls and controls the syringe pump 2, the voltage source 4, the ammeter 5, and the three-way electromagnetic valve 6 to perform the processing.

First, the syringe pump 2 feeds an aqueous solution (Medium 1) from the bottle 7 via the pipe 1*a*, and fills the inside of the flow path pipe 1*c* with the aqueous solution (reference state) (S201).

Thereafter, a predetermined voltage is applied by using the voltage source 4 (S202), and the ammeter 5 measures the current value at this time (S203).

Then, a predetermined amount of gas (Medium 2) is fed from the pipe 1*b* by the syringe pump 2 to a position at which the wettability of the flow path pipe 1*c* is intended to be evaluated (S204).

The current value is also measured by the ammeter 5 during this time, and the measurement is ended after an elapse of a predetermined time (S205).

At this time, the wettability is evaluated by analyzing a time change of the current value from at the time of gas introduction from the time when the gas starts to be fed (S206) (S207).

Example of Evaluating Wettability

An example of evaluating the wettability by using the device in the present embodiment will be described. There is prepared a pipe in which an inner wall of the pipe having an inner diameter of 1 mm is brought into contact with protein solutions (0, 0.1, 1, 10 mg/mL) having different concentrations for a predetermined time.

Figure 3:
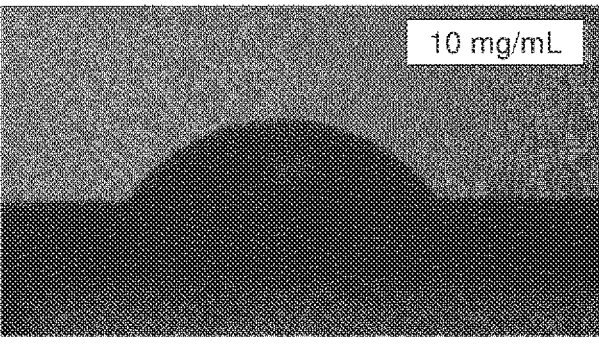
FIG. 3 is an image view showing a contact angle of water on a flat plate made of the same material as a material of a flow path pipe that is in contact with a protein solution at each concentration.
Figure 3:
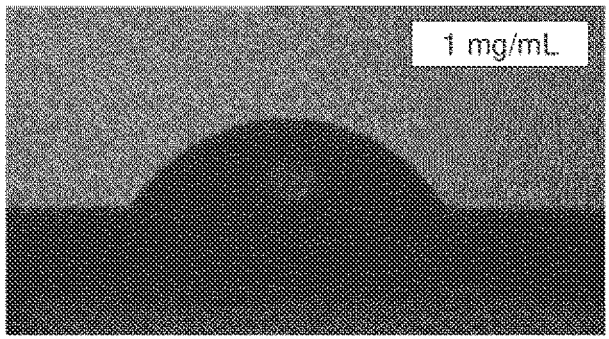
Figure 3:
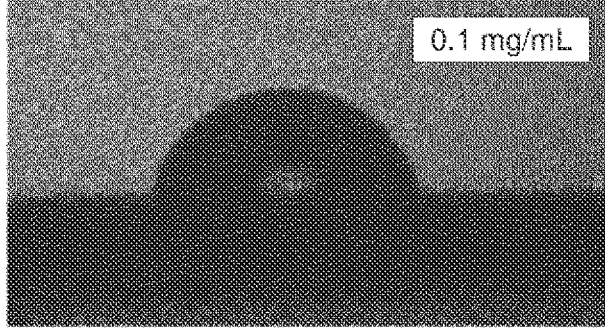
Figure 3:
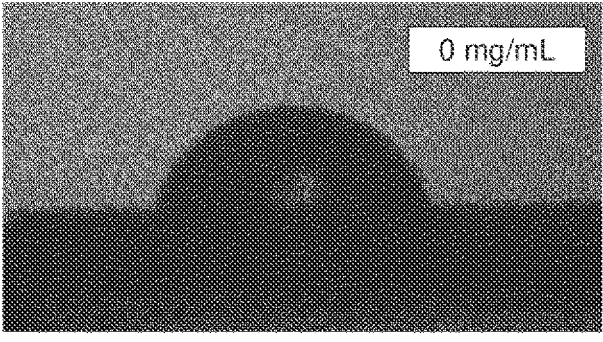

FIG. 3 shows the results obtained by treating a flat plate made of the same material as the inner wall of the pipe with the protein solution in the same manner and then measuring the contact angle. The contact angles on the flat plate are measured to be 72.3°, 71.9°, 60.2°, and 52.3°, respectively.

In the device in the present embodiment, the results obtained by evaluating the wettability of the inner wall of each pipe with the present device will be described.

Figure 4:
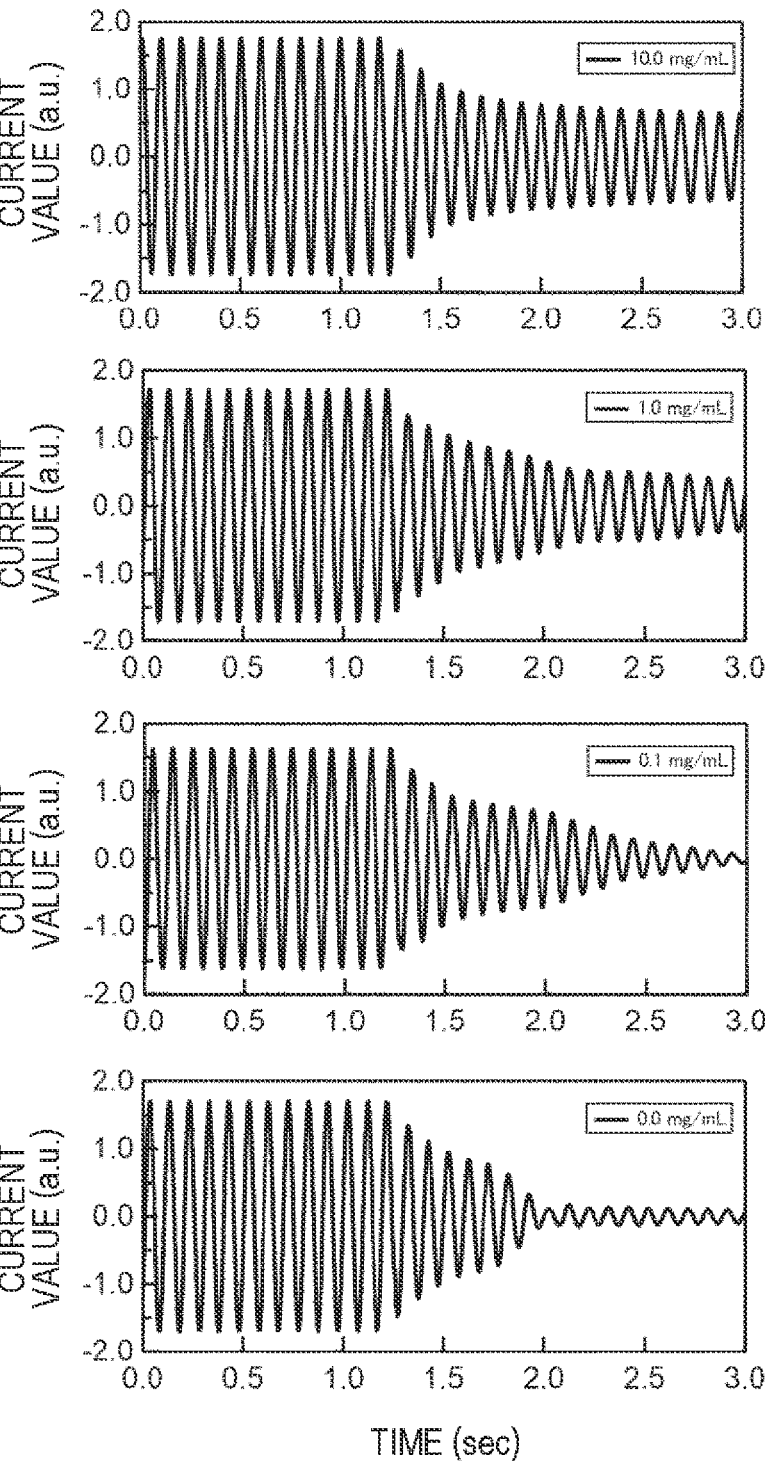
FIG. 4 is a graph showing a time change in a current value when air bubbles are introduced into a flow path that is in contact with the protein solution at each concentration.

FIG. 4 shows a relationship between the current value (vertical axis, any unit) measured in S203 and the time (horizontal axis, seconds).

Figure 5:
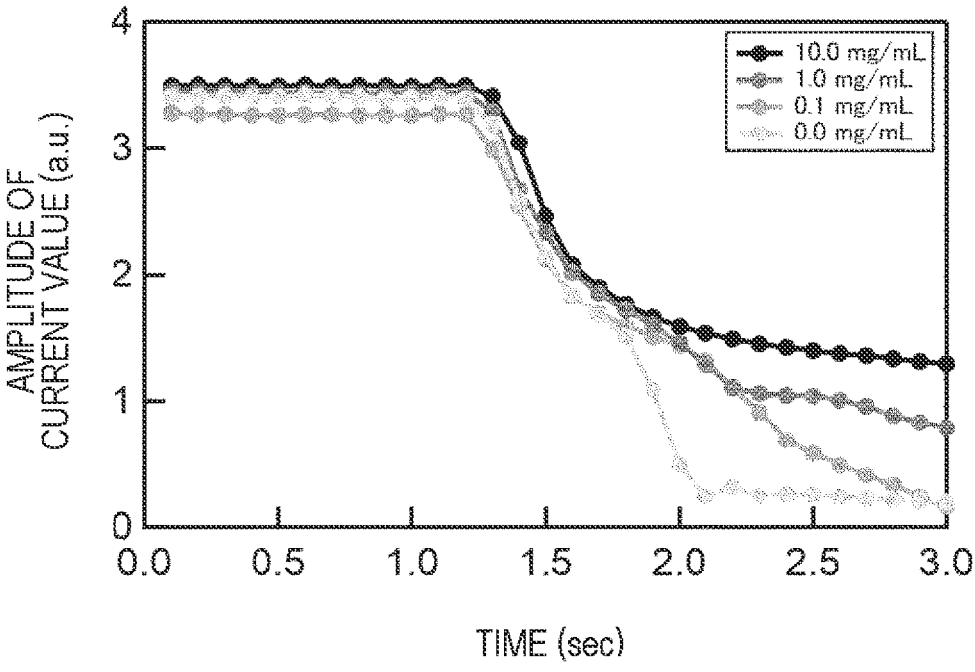
FIG. 5 is a graph showing a relationship between time and amplitude of a current value measured in FIG. 4.

FIG. 5 illustrates a relationship between the amplitude (vertical axis, any unit) of the current value measured in FIG. 4 and the time (horizontal axis, seconds).

In FIGS. 4 and 5, the inside of the pipe 1*c* is filled with an aqueous solution in advance, 2 µL of a gas is started to be introduced by the syringe pump 2, and the start timing of bubble introduction is set to 0 sec. After about 1.0 sec, the gas is moved to a part at which the wettability of the pipe 1*c* is intended to be evaluated, and then the liquid feeding is stopped.

At this time, as the voltage source 4 for application, not a DC voltage source but an AC voltage source is preferable in order to avoid deterioration of the conductor 3. In addition, when an aqueous solution is used as the medium, it is preferable that the voltage does not exceed 1.23 V in order to avoid a decrease in measurement accuracy due to electrolysis of water. Here, an AC voltage of 10 Hz and 0.2 V is applied.

In addition, it is also possible to change the frequency of the voltage to be applied, measure the impedance from the relationship of the current value with respect to the applied voltage, and use the impedance as an index for wettability evaluation. It is confirmed that the time change in the current value in each pipe varies depending on the concentration of the protein solution brought into contact with the pipe in advance.

As the pipe is processed under the condition that the contact angle on the flat plate is measured to be lower, the attenuation of the amplitude of the current tends to be gentler.

Figure 6:
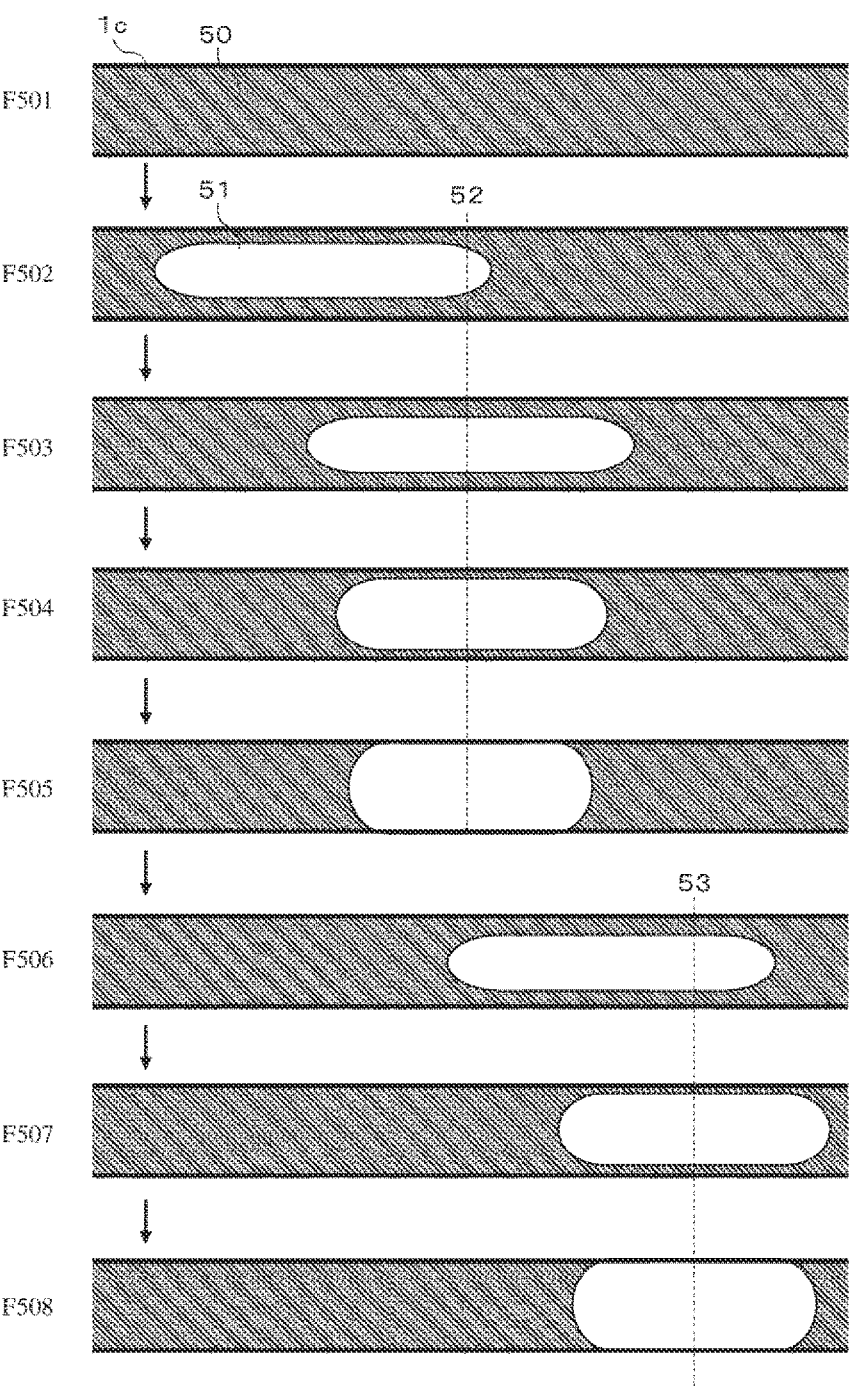
FIG. 6 is a schematic view of inner cross-section of the flow path pipe when the air bubbles are contained.

The reason why the attenuation of the current amplitude changes depending on the contact angle of the inner wall as described above will be described with reference to FIG. 6. FIG. 6 is a schematic view of an inner cross-section of the pipe 1*c*.

In a reference state, the inside of the pipe 1*c* is filled with an aqueous solution 50 (F501). Using the syringe pump 2, 2 µL of gas 51 is introduced (F502) and stopped at a position 52 for evaluation (F503).

Immediately after the stop, there is a liquid film of the aqueous solution between the introduced gas and the wall surface of the pipe 1*c*, so that the electric resistance value is low. As the liquid film gradually becomes thinner, the electric resistance value increases (F504). The gas eventually comes into contact with the wall surface (F505), and the electric resistance value rapidly increases.

In the device in the present embodiment, the difference in wettability is detected by using that the process of this change is slow when the wettability of the inner wall of the pipe is high, and is fast when the wettability is low. A region in which the wettability is evaluated by the present method is an area in which the gas is present around the position 52. For example, the evaluation range can be changed by controlling the size of the gas to be introduced, such as narrowing an evaluation region by reducing the introduction amount of the gas.

In addition, by moving the position of the gas from the position 52 to a position 53 after the end of the evaluation of the position 52, the inner walls at different positions can be continuously evaluated (F506 to F508).

As described above, the wettability of the inner wall of the pipe is deeply associated with the movement of charges between a first point and a second point interposing the position 52. Therefore, the wettability of the inner wall of the pipe can be evaluated by measuring the electrical characteristics of the pipe. Note that, in the above description, the aqueous solution and the gas are adopted as a first medium and a second medium, but the first medium and the second medium may be a gas or a liquid as long as the first medium and the second medium do not mix with each other and have different electric resistance.

In the evaluation of the wettability, the analysis unit 9 acquires a current value variation range of 2.5 sec from the start of liquid feeding as shown in FIG. 5, and evaluates the wettability from an evaluation table storing a relationship between a current-related value such as the current value variation range and the wettability parameter indicating the degree of wettability stored in advance in the database 10.

FIG. 7 illustrates an example of an evaluation table 700 stored in the database 10. Regarding data of the evaluation table 700, a current-related value (applied voltage and current analysis value) obtained by the above-described wettability evaluation is stored in advance by using a flow path in which a flow path length, a flow path inner diameter, and a wettability parameter are known. By using the relationship, the wettability parameter can be converted from the current-related value.

Note that the numerical value of the evaluation table 700 varies depending on the material of the wall surface and the types of Medium 1 and Medium 2, and thus is prepared according to the evaluation target.

As the wettability parameter, for example, a contact angle with the flat plate shown in FIG. 3 can be used. Alternatively, a parameter based on the current analysis value under a predetermined condition may be newly adopted. Alternatively, the current analysis value itself may be used as the parameter without being converted.

Examples of the conversion method include a method in which the analysis unit 9 performs calculation by using an approximate expression representing the relationship between the current-related value and the wettability parameter, and a method in which the analysis unit 9 performs calculation by using a machine learning model or the like when the analysis unit 9 cannot use the approximate expression. The data of the evaluation table 700 is rewritable. Thus, for example, it is possible to reduce the influence on a measurement error due to the variation in the applied voltage value due to the deterioration of the conductor 3a or the like.

Note that, as a method of converting the degree of wettability, not only the current value amplitude at a certain timing as in the present method, but also a regression parameter calculated by using a regression analysis such as an exponential function or an integral value of the current value amplitude in a certain time region may be used as the index.

All of the indexes may be stored in the database 10, and the index used for conversion can be changed each time.

Example of Monitoring State of Flow Path Pipe

Since the calculated degree of wettability is output to the display unit 11, a maintenance manager can ascertain the state of the flow path pipe and perform maintenance management before an occurrence of an abnormality. In addition, a replacement time or the like of the flow path can be predicted from a temporal change in wettability and the maintenance management can be performed before the occurrence of the abnormality. An example of a method of predicting the replacement time of the flow path will be described with reference to FIGS. 8 and 9.

FIG. 8 shows an example of the threshold-value database 800, for example, for maintaining a flow path pipe of a device that analyzes components in a solution. As shown in FIG. 8, the wettability parameter of each solution (Medium 1) and a threshold value serving as a guide of the replacement time are set. The threshold value can be set differently depending on the length of the replacement time. The threshold-value database 800 can be stored in the database 10, for example.

Figure 9:
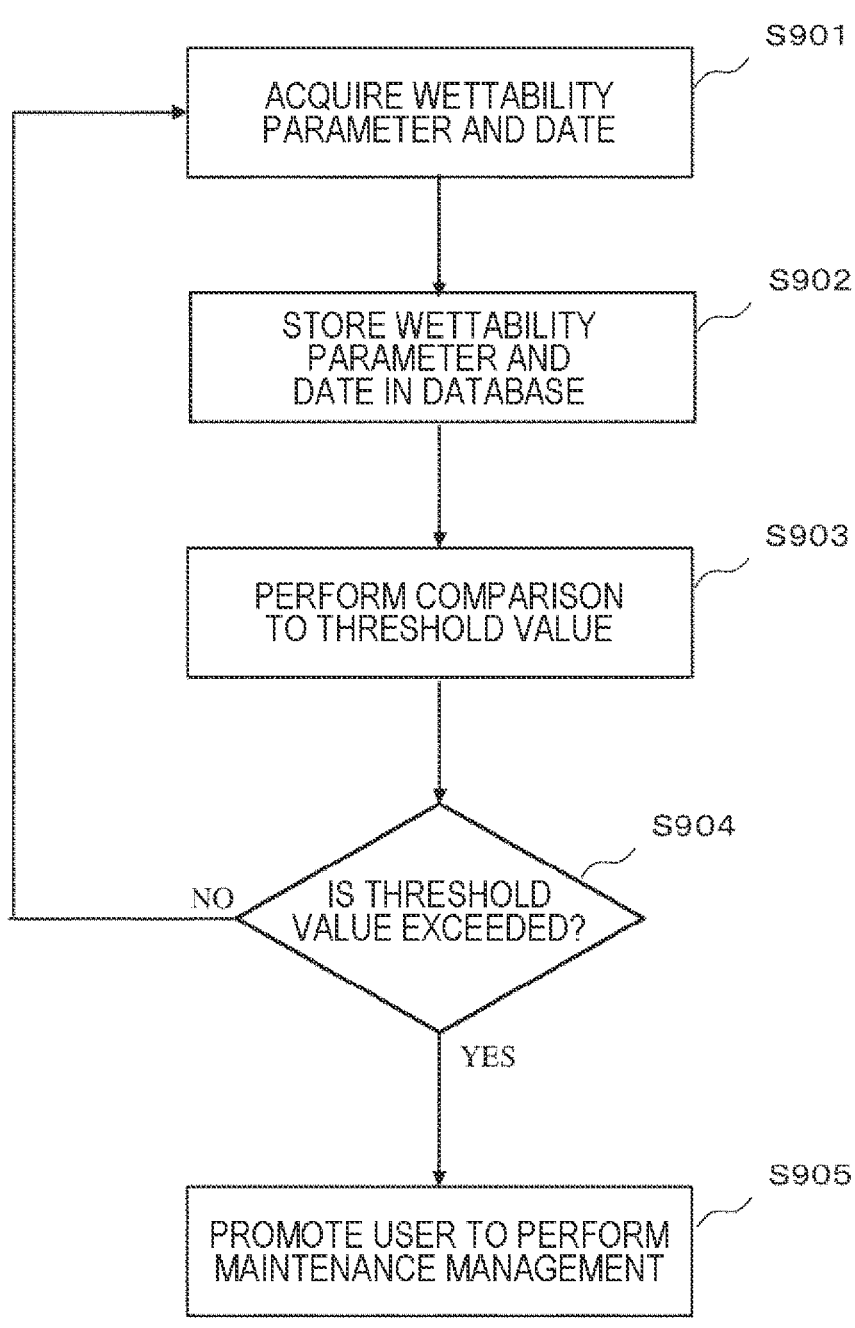
FIG. 9 is a flowchart for performing maintenance management.

FIG. 9 is a flowchart for transmitting a notification of the replacement time to the user. First, the wettability parameter and the date are acquired by the above-described method (S901). Thereafter, each of the wettability parameter and the date is stored in the database 10 as time-series data (S902).

The acquired wettability parameter is compared to the threshold value (S903), and the process returns to S901 depending on whether the wettability parameter exceeds the threshold value (S904) or the user is prompted to replace the wettability parameter (S905). As a result, it is possible to promote the user to perform maintenance management such as replacement of the flow path before the occurrence of an abnormality.

Figure 10:
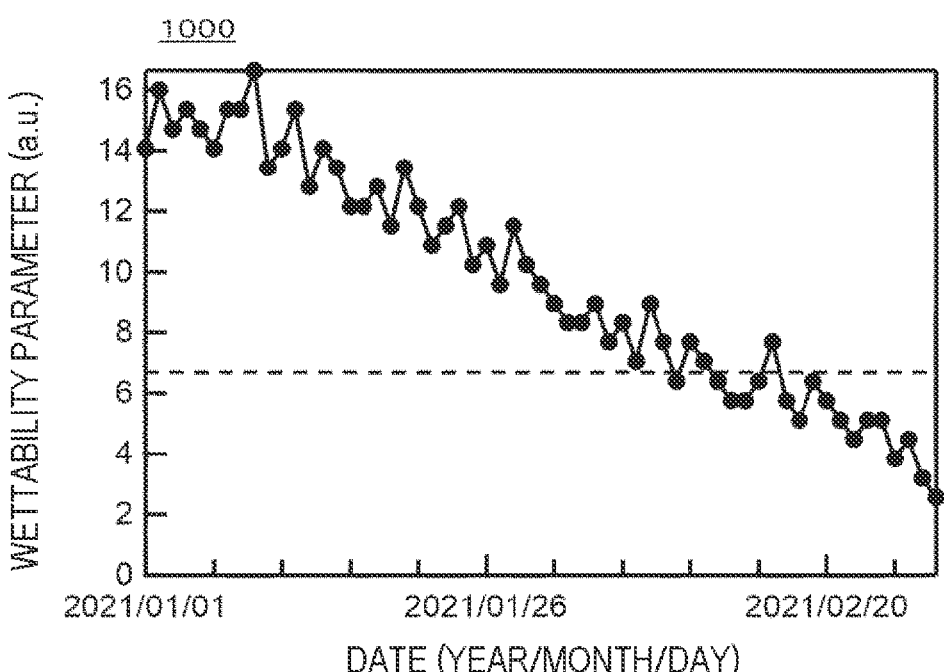
FIG. 10 is a graph showing an example of a temporal change in the wettability parameter.

FIG. 10 graphically shows an example of the time-series data stored in the database 10. Time-series data 1000 indicates the relationship between the wettability parameter and the acquisition date (date). In this example, the wettability parameter is set to 6.5 as the threshold value.

The user can output the time-series data 1000 to the display unit 11 and confirm the time-series data regardless of whether the threshold value is exceeded. As an advantage of this, the wettability may be rapidly changed depending on the characteristics of a sample passing through the flow path, and it is difficult to accurately predict the replacement time by setting the threshold value. Therefore, by observing the temporal change in the wettability parameter, it is possible to cope with the wettability evaluation in such an irregular use situation.

In order to suppress the electrolysis of the sample due to the voltage application by the voltage source 4, it is desirable to apply an AC voltage having a voltage value as small as possible. In addition, the wettability can be quantitatively evaluated by acquiring, in advance, the relationship between the change in the current value and the contact angle or the like related to the wettability. In addition, in order to evaluate the electric conductivity in the flow path, it is desirable to use an insulating material having an electric resistance value of 1 GΩ or more inside and outside the wall of the flow path for the flow path pipe 1c.

As described above, in the present embodiment, the wettability of any inner wall of the pipe 1c can be evaluated. Therefore, by making the pipe corresponding to the 1c portion detachable, the wettability of the inner wall of another pipe can be evaluated by replacing the pipe.

In the present embodiment, the aqueous solution is used for Medium 1 and air is used for Medium 2, but any fluids that does not mix with each other and is substances having different conductivity can be adopted. As long as one medium has high conductivity and the other medium has low conductivity, the effects in the embodiment are exhibited in any combination. For example, a combination of liquids may be used.

As described above, according to the present configuration, two different media are introduced into the flow path pipe, and the current value of the current flowing with respect to the voltage applied to the flow path pipe is used. In this manner, it is possible to evaluate the degree of wettability even in a flow path pipe in which observation of the inside is not possible, and there is an effect that it is possible to ascertain the state of the flow path pipe from the evaluation result, and to perform maintenance management before liquid feeding abnormality occurs.

Modification Example of First Embodiment

Figure 11:
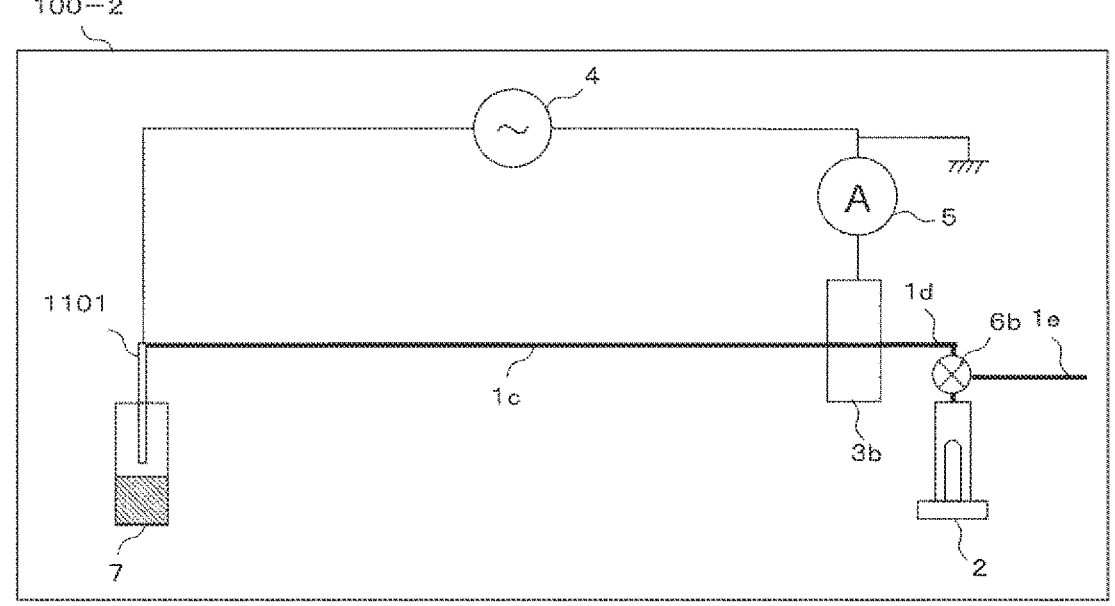
FIG. 11 is a schematic block diagram showing a modification example of the wettability evaluation device according to the first embodiment.

FIG. 11 illustrates a modification example of the measurement unit 100 in the embodiment of FIG. 1. The modification example of FIG. 11 is characterized in that a measurement unit 100-2 includes a nozzle 1101 that is made of a conductor and has an up-down movable mechanism. When the nozzle 1001 is located at the lower portion, the aqueous solution in the bottle 7 can be introduced into the pipe 1c. When the nozzle 701 is moved above a liquid level, air can be introduced. Therefore, the three-way electromagnetic valve 6a of FIG. 1 is unnecessary.

In addition, since the nozzle 1001 is electrically connected to the voltage source 4 and the ammeter 5, the conductor 3a of FIG. 1 is unnecessary. Note that, although not illustrated, if a tube pump is used instead of the syringe pump 2, the three-way electromagnetic valve 6b is also unnecessary, and thus a simpler configuration can be achieved.

As described above, when the measurement unit 100-2 includes means for introducing two types of media into the pipe of an evaluation target unit, means for applying a voltage, and means capable of measuring a change in a current flowing through the pipe, the effects of the embodiment are exhibited.

Second Embodiment

An example in which the wettability evaluation device described in the first embodiment is applied to an electrolyte analyzer that measures an electrolyte concentration in a sample solution will be described. The electrolyte analyzer can measure a specific electrolyte concentration contained in an electrolyte solution such as blood or urine. The electrolyte analyzer performs concentration measurement by using an ion-selective electrode. As a general measurement method, a sample solution as an electrolyte solution is supplied to an ion-selective electrode, and a potential difference from a reference electrode is measured. In addition, a standard liquid is supplied to the ion-selective electrode, and a potential difference from a comparative electrode solution is measured in the same manner. As is known, the electrolyte concentration of the sample solution can be calculated from the potential difference between the two electrodes.

Figure 12:
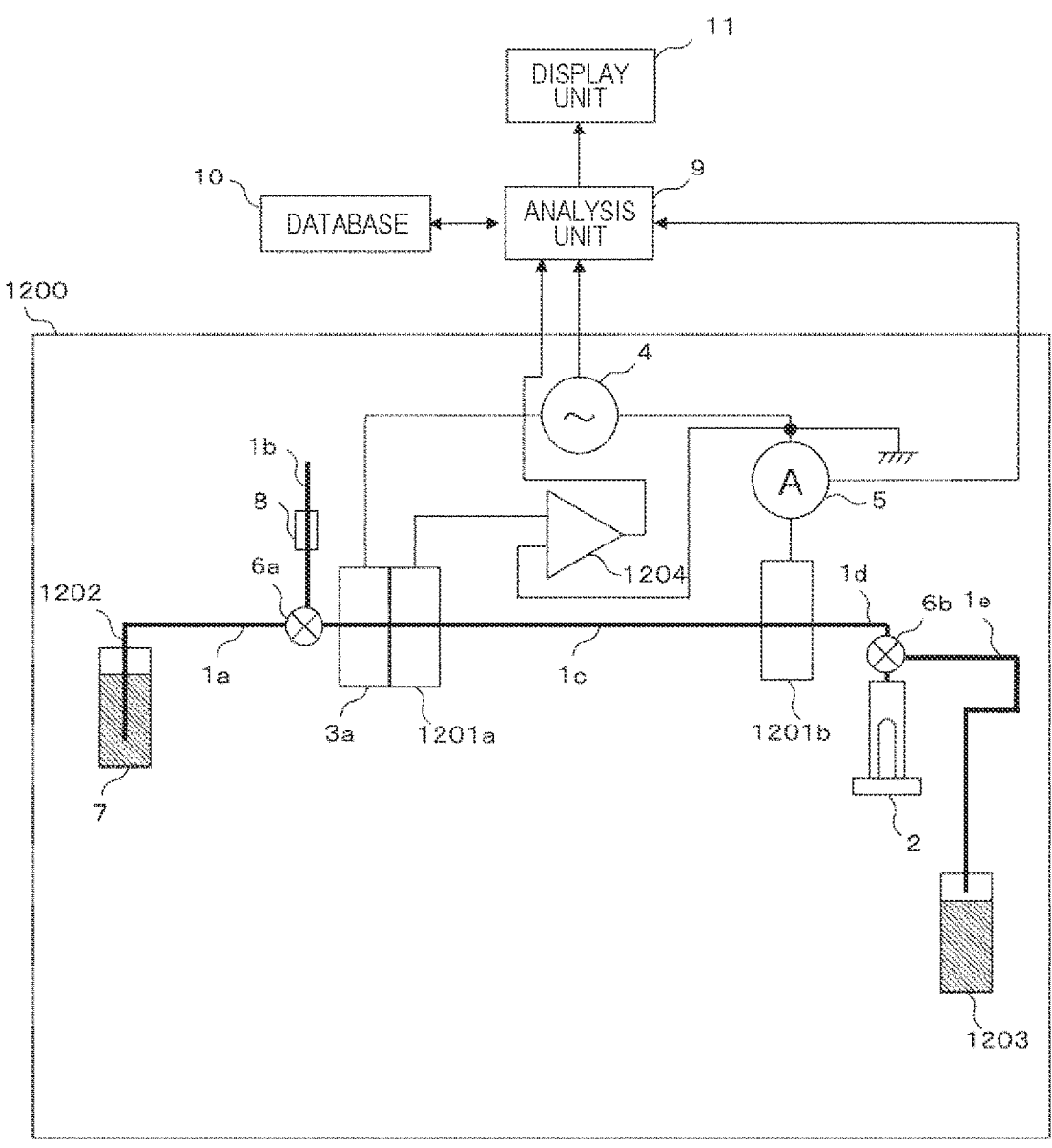
FIG. 12 is a schematic block diagram showing a wettability evaluation device having a flow path pipe on which an ion-selective electrode is mounted, according to a second embodiment.

FIG. 12 shows a wettability evaluation device according to a second embodiment. A measurement unit 1200 of the device in the present embodiment includes an ion-selective electrode 1201a and a reference electrode 1201b in addition to the configuration of the measurement unit 100 in the first embodiment. A suction nozzle 1202 operates to introduce a sample solution from the bottle 7 into a flow path pipe 1c. A reference liquid bottle 1203 connected to a flow path pipe 1e may store a reference liquid and supply the reference liquid to the flow path pipe 1c. The potential difference between the ion-selective electrode 1201a and the reference electrode 1201b is configured to be measurable by a potentiometer 1204. The reference electrode 1201b can also serve as a conductor 3b.

This evaluation device can measure the electrolyte concentration in the sample solution by measuring the potential difference between the ion-selective electrode 1201a and the reference electrode 1201b. An analysis unit 9 is used for conversion of the electrolyte concentration by potential difference measurement. It is assumed that the analysis unit 9 has a known electrolyte concentration analysis function.

In the present embodiment, the wettability of the flow path pipe 1c can be evaluated for both the sample solution and the reference liquid by the method described in the first embodiment.

As described to the present above, according configuration, there are effects that it is possible to evaluate the degree of wettability of a flow path pipe of the device having the flow path pipe on which the ion-selective electrode 1201 is mounted, it is possible to ascertain the state of the flow path pipe from the evaluation result, and perform the maintenance management before the liquid feeding abnormality occurs, and the accuracy of the electrolyte analysis is improved.

Modification Example of Second Embodiment

Figure 13:
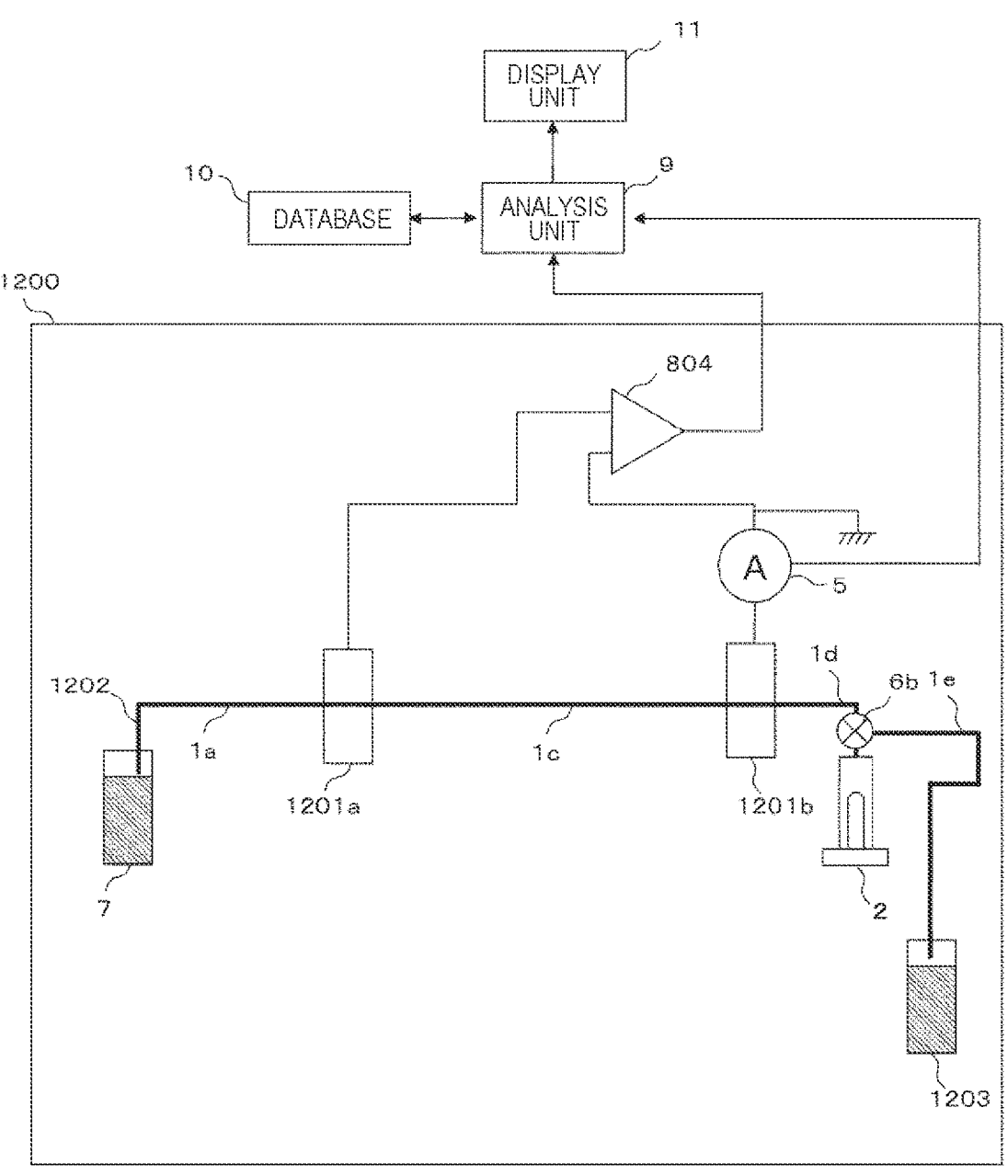
FIG. 13 is a schematic block diagram showing a modification example of the wettability evaluation device according to the second embodiment.

FIG. 13 illustrates a modification example of the second embodiment. In this modification example, in the evaluation of the wettability of the flow path pipe 1c mounted on the present analyzer, the suction nozzle 1202 is vibrated to change the impedance and apply a voltage to the flow path pipe 1. The current value of a current flowing through the flow path pipe 1 is measured by using the ammeter 5, and the wettability is evaluated from the analysis of the time change of the current value and the like as in the first embodiment.

In this configuration, in order to suppress deterioration and cost of the ion-selective electrode 1201, the voltage source 4 described in the first embodiment is not provided, and voltage application is substituted by an up-down operation of the suction nozzle 1202. In addition, the voltage may be applied by the vibration of the bottle 7 or the vibration of a constituent element disposed in the vicinity of the suction nozzle 1202.

Figure 14:
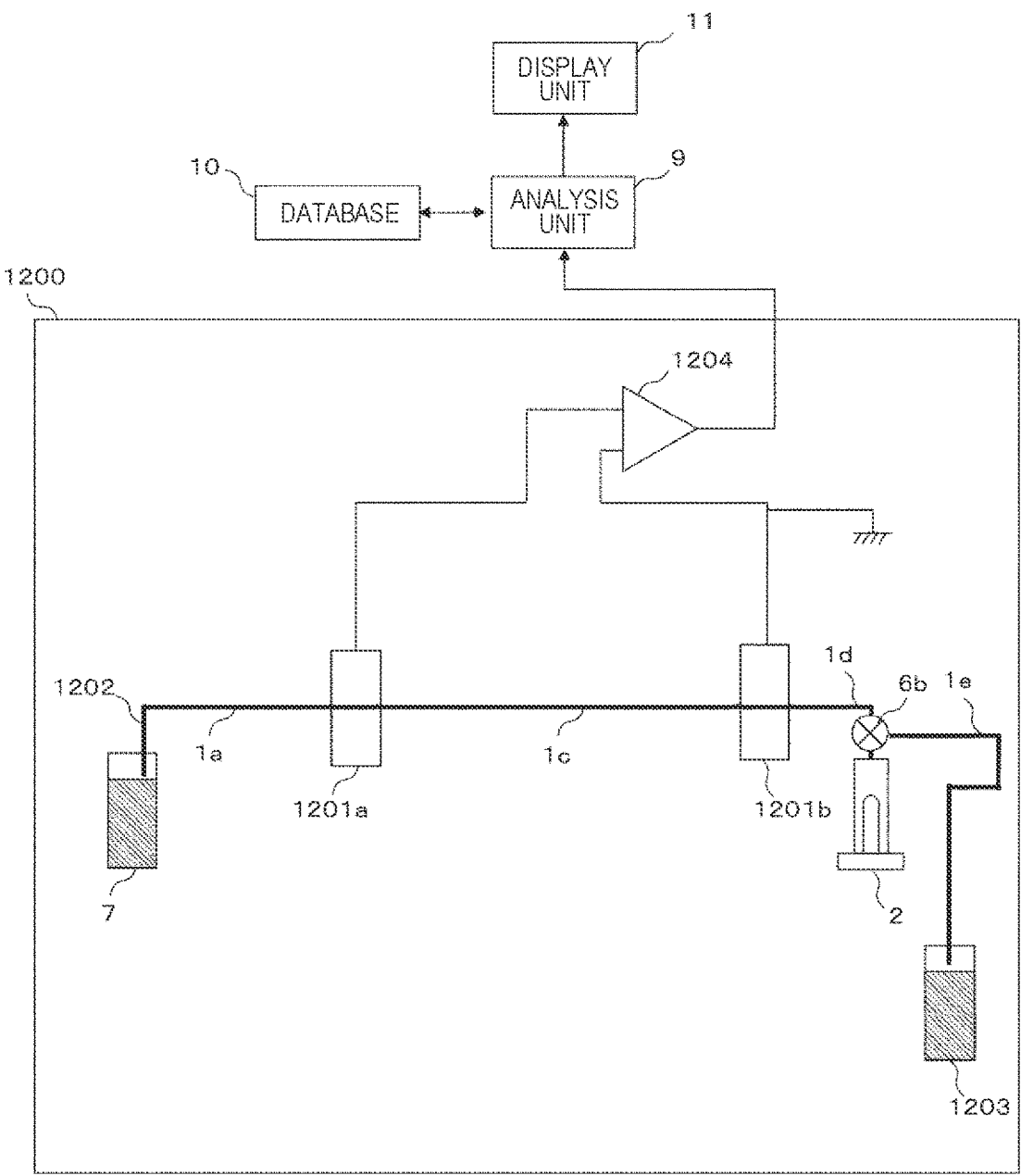
FIG. 14 is a schematic block diagram showing another modification example of the wettability evaluation device according to the second embodiment.

FIG. 14 illustrates another modification example of the second embodiment. In this modification example, the wettability is evaluated using a time change of a potential value output by the potentiometer 1204 instead of the ammeter 5. At this time, it is necessary to use predetermined conditions for the voltage value to be applied, the frequency thereof, and the like, and these pieces of information are also stored in the database 10.

As a result obtained in a manner that the phenomena shown in F501 to F505 in FIG. 6 has occurred in the flow path pipe 1c, the electrical resistance between the ion-selective electrode 1201a and the reference electrode 1201b increases with time. The time change in the electric resistance is reflected as the time change of the potential value output by the potentiometer 1204 in the voltage applied by the up-down operation of the suction nozzle 1202. The wettability can be evaluated by measuring the time change in the potential value.

As described above, in this modification example, there are effects that it is possible to ascertain the state of a flow path pipe by evaluating the wettability and to perform the maintenance management before the liquid feeding abnormality occurs, while replacing the functions of the voltage source, the ammeter, and the like by utilizing the device configuration already mounted, as the method of reducing the device space or the mounting cost.

REFERENCE SIGNS LIST 1 flow path pipe
2 syringe pump
3 conductor
4 voltage source
5 ammeter 6 three-way electromagnetic valve
7 bottle
8 air filter
9 analysis unit
10 database
11 display unit
100 measurement unit
200 control unit

The invention claimed is:

1. A wettability evaluation device comprising:
a flow path into which a first medium and a second medium are introduced;
a measuring instrument that measures a current value of a current flowing through the flow path when the first medium and the second medium are introduced; and
a control unit that evaluates wettability of an inner wall surface of the flow path based on a time change of the current value.

2. The wettability evaluation device according to claim 1, further comprising
an AC voltage source that applies an AC voltage to the flow path.

3. The wettability evaluation device according to claim 1, further comprising
a voltage source that applies a voltage to the flow path, the voltage not exceeding 1.23 V.

4. The wettability evaluation device according to claim 1, further comprising
a voltage source that applies a voltage to the flow path, the voltage being generated by mechanical displacement of a constituent element.

5. The wettability evaluation device according to claim 1, wherein an ion-selective electrode is provided in the flow path.

6. The wettability evaluation device according to claim 1, wherein, by referring to a table storing a relationship between the current value and the wettability, the wettability of the inner wall surface of the flow path is ascertained by the control unit from the current value, and maintenance of the flow path is promoted.

7. The wettability evaluation device according to claim 1, wherein an aqueous solution and a gas are used as the first medium and the second medium.

8. The wettability evaluation device according to claim 1, wherein the flow path is a pipe having an inner diameter of 5 mm or less.

9. The wettability evaluation device according to claim 1, wherein the flow path has an electric resistance of 1 GΩ or more between an inner wall and an outer wall.

10. A wettability evaluation method comprising the steps of:
preparing a flow path;
introducing a first medium and a second medium into the flow path;
measuring a current value of a current flowing through the flow path when the first medium and the second medium are introduced;
evaluating wettability of an inner surface of the flow path based on a time change of the current value.

11. The wettability evaluation method for evaluating wettability according to claim 10, wherein the step of evaluating wettability includes applying AC voltages having different frequencies to the flow path.

* * * * *